United States Patent
Elden

(10) Patent No.: US 9,392,766 B1
(45) Date of Patent: Jul. 19, 2016

(54) PORTABLE PET CARRIER TO TRANSPORT A PET FROM ONE LOCATION TO ANOTHER AND RETAIN THE PET IN THE CARRIER WHILE TRAVELING

(71) Applicant: Richard Elden, Carson, CA (US)

(72) Inventor: Richard Elden, Carson, CA (US)

(*) Notice: Subject to any disclaimer, the term of this patent is extended or adjusted under 35 U.S.C. 154(b) by 95 days.

(21) Appl. No.: 14/517,745

(22) Filed: Oct. 17, 2014

Related U.S. Application Data

(60) Provisional application No. 61/893,259, filed on Oct. 20, 2013.

(51) Int. Cl.
*A01K 1/00* (2006.01)
*A01K 1/02* (2006.01)
*A01K 29/00* (2006.01)

(52) U.S. Cl.
CPC .............. *A01K 1/0035* (2013.01); *A01K 1/029* (2013.01); *A01K 1/0245* (2013.01); *A01K 29/00* (2013.01)

(58) Field of Classification Search
CPC . A01K 1/0035; A01K 1/0236; A01K 1/0245; A01K 1/0254; A01K 1/0272; A01K 1/0281; A01K 1/029; A01K 1/03; A01K 1/033; A01K 1/034
USPC ......... 119/482, 485, 496–501, 452–453, 474, 119/477, 416
See application file for complete search history.

(56) References Cited

U.S. PATENT DOCUMENTS

| | | | | |
|---|---|---|---|---|
| 4,509,461 A * | 4/1985 | Peck | ................. | A01K 1/0236 119/753 |
| 4,852,520 A * | 8/1989 | Goetz | ................. | A01K 1/0245 119/497 |
| 4,977,857 A * | 12/1990 | Slawinski | ............ | A01K 1/0254 119/497 |
| 5,603,573 A * | 2/1997 | Mercier | .............. | A01K 1/0236 119/497 |
| 5,653,194 A * | 8/1997 | Guy | ....................... | A01K 31/08 119/453 |
| 6,021,740 A * | 2/2000 | Martz | .................. | A01K 1/0254 119/482 |
| 6,076,485 A * | 6/2000 | Peeples | ................ | A01K 1/0254 119/496 |
| 6,688,516 B1 * | 2/2004 | Ussen | ..................... | B65D 5/42 119/474 |
| 7,458,451 B2 * | 12/2008 | Godshaw | ............. | A01K 1/0254 190/107 |
| 7,617,797 B2 * | 11/2009 | Lam | ..................... | A01K 1/0245 119/28.5 |
| 7,789,044 B2 * | 9/2010 | McGrade | ............. | A01K 1/0254 119/496 |
| 8,579,305 B2 * | 11/2013 | Hou | ......................... | B62B 3/02 280/37 |
| 2006/0278173 A1 * | 12/2006 | Kamijo | ................ | A01K 1/0254 119/496 |
| 2007/0215425 A1 * | 9/2007 | Slater | ................... | A01K 1/0254 190/115 |
| 2009/0205578 A1 * | 8/2009 | Alves | ................... | A01K 1/0107 119/454 |
| 2010/0175633 A1 * | 7/2010 | Krauss | ................. | A01K 1/0254 119/497 |
| 2011/0056441 A1 * | 3/2011 | Chang | ................. | A01K 1/0245 119/453 |
| 2011/0197823 A1 * | 8/2011 | Pietra | .................. | A01K 1/0353 119/497 |

* cited by examiner

*Primary Examiner* — Joshua Huson
(74) *Attorney, Agent, or Firm* — Thomas I. Rozsa

(57) ABSTRACT

A portable pet carrier which can be folded flat for storage when not in use and which can be moved in a horizontal direction with the pet carrier removably attached to a rollable platform having a unique carrying handle rotatable to be at an angle to the pet carrier to permit the pet carrier to be transported from one horizontal location to another with the pet carrier remaining in a horizontal orientation to facilitate the pet's comfort during transportation. The pet carrier is also small enough and flexible enough to be retained under a passenger seat of an airplane.

18 Claims, 18 Drawing Sheets

PORTABLE PET CARRIER TO TRANSPORT A PET FROM ONE LOCATION TO ANOTHER AND RETAIN THE PET IN THE CARRIER WHILE TRAVELING

CROSS-REFERENCE TO RELATED APPLICATION

This patent application claims priority to Provisional Application No. 61/893,259 filed on Oct. 20, 2013.

BACKGROUND OF THE INVENTION

1. Field of the Invention

The present invention relates to the field of transporting animals, and in particular family pets, primarily dogs and cats, from one location to another. The present invention is particularly directed to the field of pet carriers which are used to retain and transport a pet such as a small dog or cat while a person is traveling from one location to another, especially on airplanes.

2. Description of the Prior Art

Pets, especially dogs and cats, having become loving members of families throughout the world. People frequently take their pet dog or cat with them while they are away on a trip for business or pleasure rather than putting the pet in a boarding kennel or in a veterinarian's facility.

In general, numerous types of carriers used to retain and transport a pet, primarily a small dog or cat, from one location to another are known. Some carriers have a floor and circumferential wall and top with a carrying handle with a closable opening through which the pet is put inside the carrier and then closed in a manner which retains the pet within the carrier. This type of carrier is most frequently used when taking the pet to a veterinarian's office or groomer's facility or when traveling with the pet in a car. The carrier is made of rigid material and is not foldable, so storage of the carrier when not in use requires sufficient unused space in a garage or storage shed to store the carrier. It is also difficult to bring the carrier onto an airplane.

Some carriers have been placed on wheels to facilitate transport but are usually too large to fit under a seat in an airplane. The carrying handle in such carriers is also rigid and requires the carrier to be rolled at an angle while the pet owner is pulling the rolling carrier, thereby leading to the pet's discomfort.

There is a significant need for a small pet carrier which solves many of the problems associated with prior art pet carriers.

SUMMARY OF THE INVENTION

The present invention is a portable pet carrier which can be folded flat for storage when not in use and which can be moved in a horizontal direction with a unique carrying handle and strong flat base to permit the pet carrier to be transported from one horizontal location to another with the pet carrier remaining in a horizontal orientation to facilitate the pet's comfort during transportation. The pet carrier is also small enough and flexible enough to be retained under a passenger seat of an airplane.

One key feature of the present invention pet carrier is a flat base which has four wheels of which the rear two wheels are heavy duty luggage wheels that rotate in a straight direction and the initial front two wheels are rotating wheels so that the platform can be rotated in any direction. A key innovation of the present invention is the flat rollable base onto which the carrier can be removably retained.

A second key innovation of the present invention pet carrier is an innovative handle which telescopes and can be rotated to a 45 degree angle relative to the flat base so that a person can be walking with the pet carrier removably attached to the flat base retained in a horizontal orientation relative to the ground as opposed to prior art pet carriers which have handles affixed along a rear surface of the pet carrier and cause the pet carrier to extend upwardly at an angle to the horizontal while it is rolled on the ground. In addition, when the pet carrier is not being transported from one location to another, the telescoping handle can be folded flat and rotated so that it is horizontally aligned with the underside of the horizontal platform and then rotated so that it is retained under the platform, both while the pet carrier portion is stored under a seat and for purposes of storage.

Another innovation of the present invention is that the pet carrier contains a strap having a pair of hook or loop strips on opposite sides of the strap so that the strap can be rotated around the bottom of the flat platform and fastened together under the flat platform to removably retain the pet carrier onto the flat platform. In addition, the pet carrier has a pair of spaced apart hook or loop fasteners on its bottom surface and the upper surface of the flat platform has a mating pair of spaced apart hook or loop fasteners which mate with a respective hook or loop fastener on the underside of the pet carrier to further removably retain the pet carrier onto the flat platform.

Another innovation is that the pet carrier can be folded flat against the horizontal platform with the strap and its hook and loop fasteners wrapped around the folded pet carrier and platform and fastened with the straps mating hook and loop fasteners so that the entire assembly is very flat and folds to less than four inches in width when in the unused condition to facilitate convenient storage.

The key innovative features of the present invention include:

1. A pet transport carrier where the carrier itself can be unfolded and rests on a flat horizontal base where it is affixed by a pair of mating hook and loop fasteners on the front and back and then a separate strap affixed to the bottom surface of the pet carrier that has mating hook and loop fasteners adjacent respective ends of the strap so that the strap is wrapped around the flat horizontal case and goes underneath the flat base to further secure the pet transport carrier to the flat horizontal base.

2. The flat horizontal base has a rotatable handle that can be rotated at an angle relative to the flat horizontal base and the pet transport carrier is affixed to the flat horizontal base for use so that a person can be pulling the flat horizontal base with wheels attached to the underside of the flat horizontal base and the pet carrier affixed to the flat horizontal base behind them without having the pet carrier moved at an upward angle which is uncomfortable for the pet. This unique feature enables the carrier to be rotated in a horizontal manner.

3. The handle is a telescoping handle which can be moved to a compressed state and then slid under a receiving telescoping member underneath the flat horizontal base and then the pet carrier can be folded flat and retained against the flat base in the unused condition so that it can fold flat to less than four inches.

4. The flat horizontal base has four wheels of which the rear two wheels are heavy duty luggage wheels that rotate in a straight direction and the initial front two wheels are rotating wheels so that the platform can be rotated in any direction.

5. Also, with the carrier removed, the platform itself can support a weight of 100 pounds so that a pack of water bottles, a pack of soda etc. can be moved with the flat cart. This is an ancillary benefit.

6. The pet carrier itself is also small enough so that it can fit under a coach passenger seat in a coach aircraft so that people who travel with pets can carry the animal on the plane and retain the pet such as a small dog or cat within the carrier.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
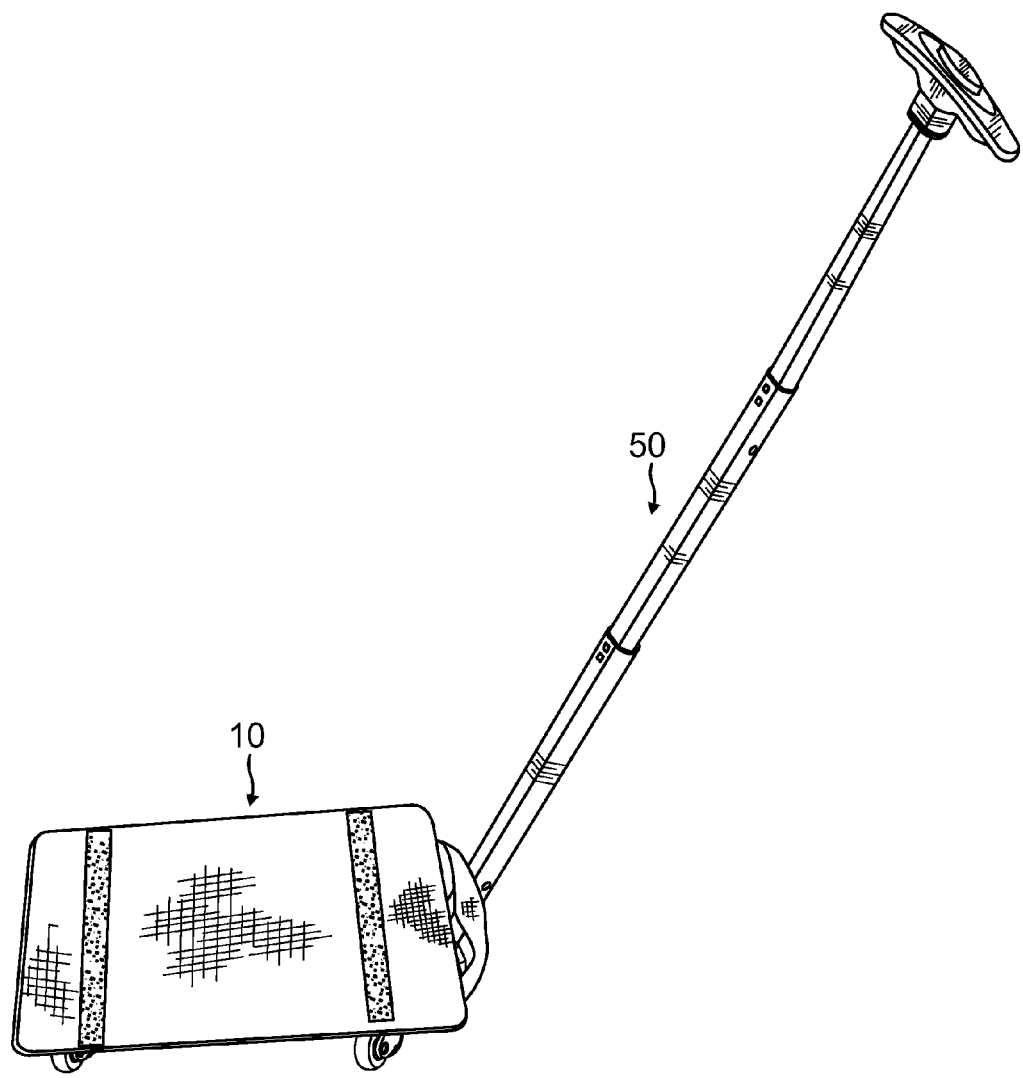
FIG. 1 is a perspective view of the flat horizontal base of the present invention which includes a telescoping handle extending at an angle such as 45 degrees to the flat horizontal base.
Figure 2:
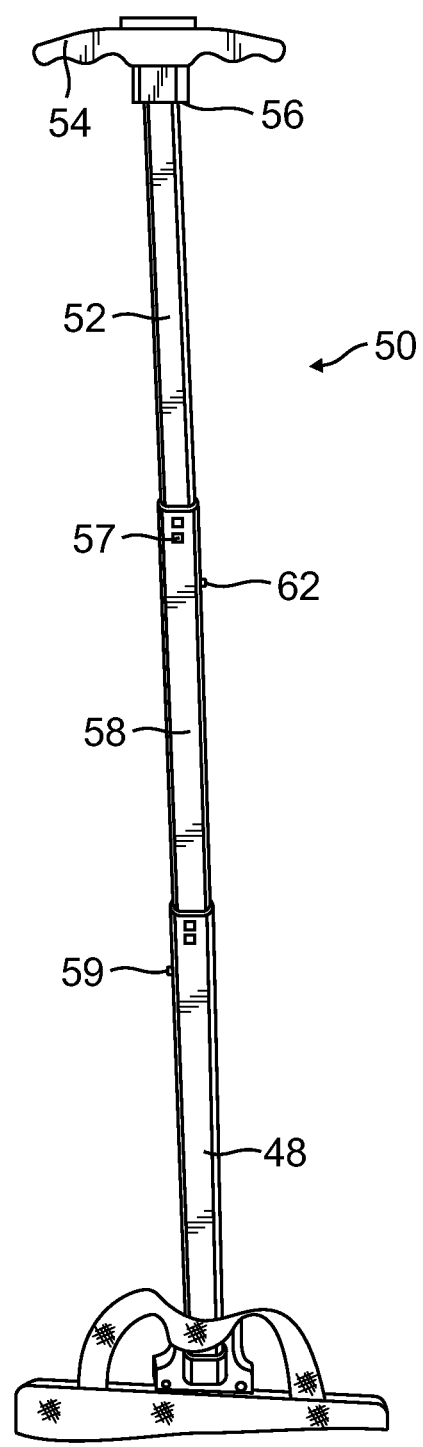
FIG. 2 is a close-up view of the telescoping handle having a first section which terminates in a transverse handle at its distal end and is connected to a second section at its proximal end which is connected to a third section which is connected to a rotation mechanism.
Figure 12:
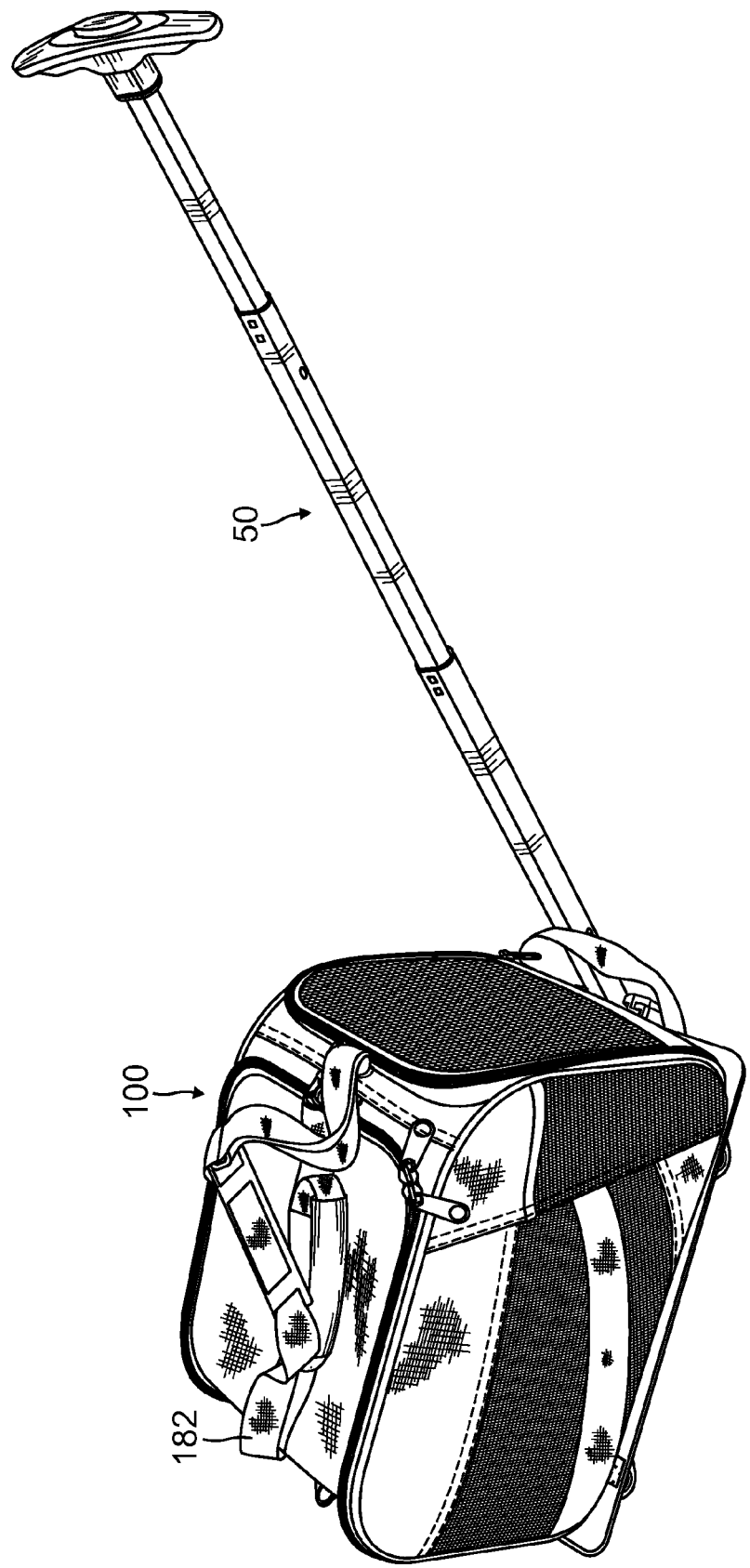
FIG. 12 is a front perspective view of the pet transport carrier attached to the flat horizontal base (also called a platform or dolly) with the telescoping handle at 45 degrees relative to the dolly, also illustrating a removable shoulder strap.
Figure 13:
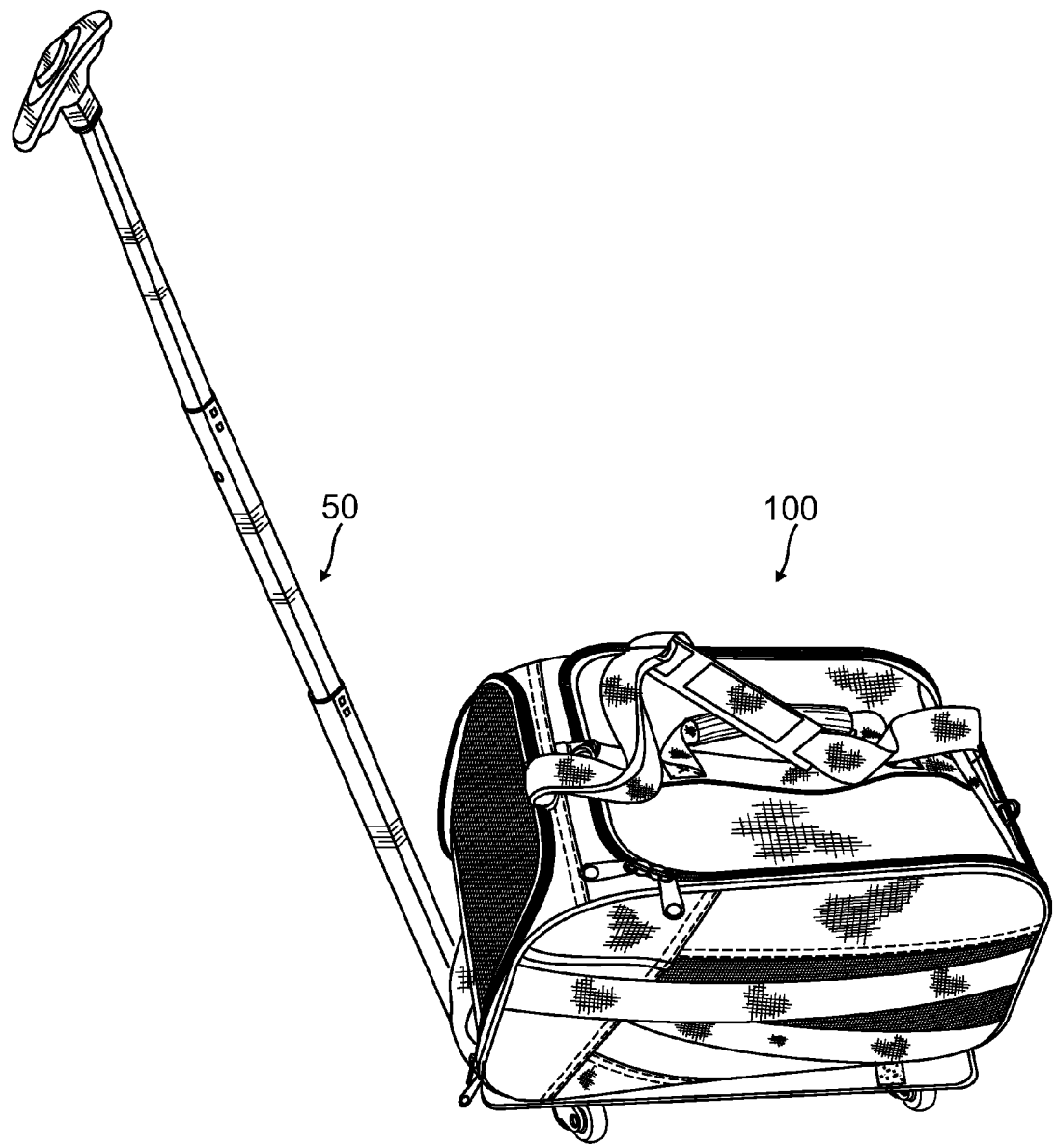
FIG. 13 is a side view of the pet transport carrier attached to the flat horizontal base (also called a platform or dolly) with the telescoping handle at 45 degrees relative to the dolly.

Referring to FIG. 1, there is illustrated a perspective view of the flat horizontal base or dolly 10 of the present invention which includes a telescoping handle 50 which extends at an angle such as 45 degrees to the flat horizontal base 10 as illustrated in FIGS. 12 and 13. As illustrated in the close-up view of FIG. 2, the telescoping handle 50 has a first section 52 which terminates in a transverse handle 54 at its distal end 56 and is connected to a second section 58 at its proximal end 57. The first section 52 has a smaller diameter than the second section 58 and is retained in its extended condition by a transverse pin 62 extending through respective aligned openings in the first section 52 and second section 58. When the transverse pin 62 is pushed inwardly, the first section 52 is pushed into and retained in second section 58. The second section 58 has a rotatable mechanism 64 which enables the telescoping handle 50 to be rotated to the extended position illustrated in FIG. 2. The rotatable mechanism is illustrated in detail in the close-up view of FIG. 3. The rotatable mechanism 64 enables the telescoping handle 50 to be rotated to a horizontal position as illustrated in FIG. 2 and then as illustrated in the bottom plan view of the flat horizontal base 10 illustrated in FIG. 4, is rotated horizontally under base 10 and retained under horizontal surface 14 of base 10 by a telescoping retaining sleeve 60 which in turn is retained by a first retaining member 66 and spaced apart second retaining member 68 with the transverse handle 54 adjacent the rotation member 64 which enables the second handle section 58 to be rotated to the angled orientation illustrated in FIG. 2.

Figure 3:
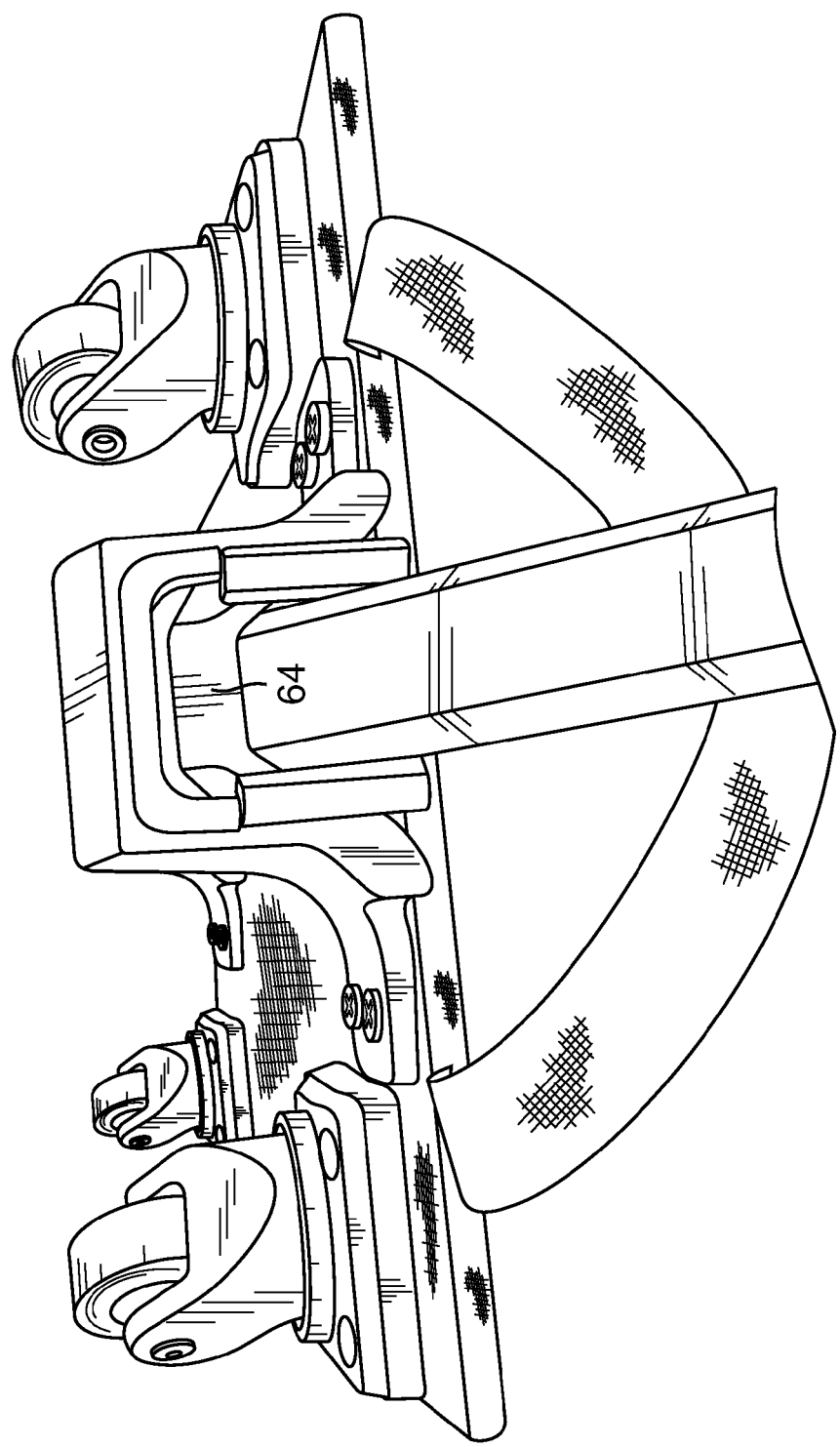
FIG. 3 is a perspective detailed view of the rotation mechanism connected to the telescoping rotatable handle.

The second section 58 is connected to a third telescoping section 48 which again has a pin 49 which keeps the two sections 58 and 48 apart. The end of third section 48 is connected to a rotatable mechanism 64 as illustrated in FIG. 3. Third section 48 is attached to the rotatable mechanism 64 which enables the telescoping handle 52 to rotate to the extended position as illustrated in FIGS. 12 and 13.

Figure 4:
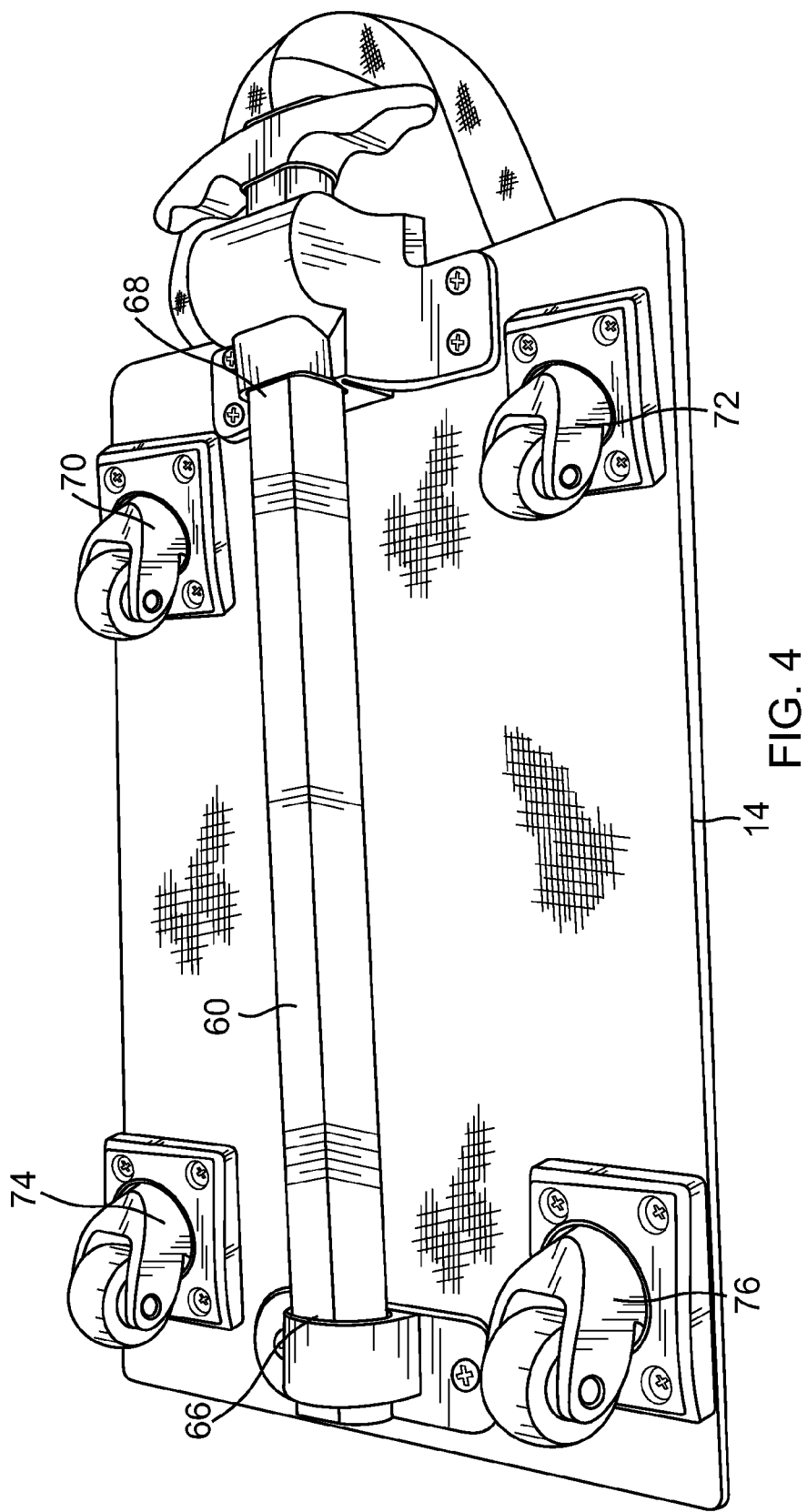
FIG. 4 is a the bottom plan view of the flat horizontal base with the telescoping handle rotated horizontally under the base and retained under the horizontal surface of the base by a telescoping sleeve, and then a flat horizontal base having four wheels affixed to the bottom surface of which two wheels are heavy duty luggage wheels that rotate in a straight direction and the front two wheels are rotating wheels so that a flat horizontal base platform can be rotated in any direction.

Further referring to FIG. 4, a key feature of the present invention is the bottom surface 14 of the flat horizontal base 10 having four wheels affixed to the bottom surface 14 of which the rear two wheels 70 and 72 are heavy duty luggage wheels that rotate in a straight direction and the initial front two wheels 74 and 76 are rotating wheels so that a flat horizontal base platform 10 can be rotated in any direction. A key innovation of the present invention is the fact that there is a flat horizontal base 10 on which the carrier can be retained.

As discussed, the second key innovation which is shown in FIG. 1 and later in FIGS. 12 and 13 is the innovative handle 50 which telescopes and can be rotated to a 45 degree angle so that a person can be walking normally and the flat horizontal base can be pulled on a flat surface without having to have the flat horizontal base platform 10.

Figure 5:
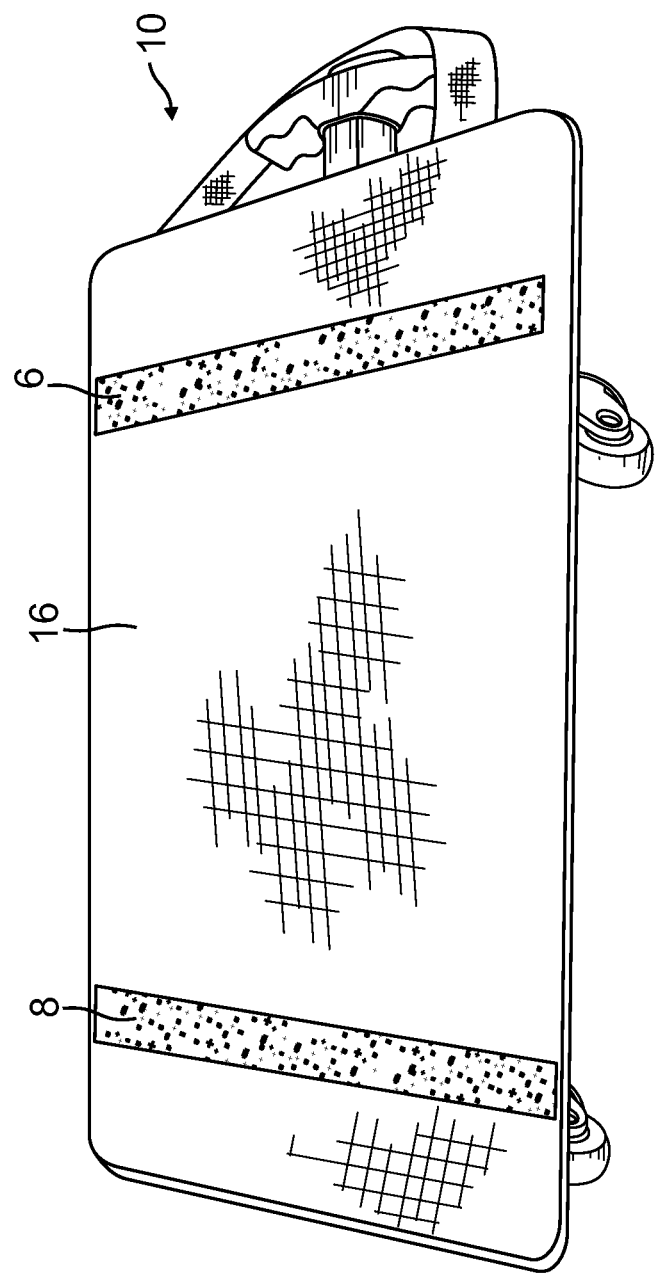
FIG. 5 is a top plan view of the flat horizontal base section having a top surface with a first hook or loop fastener attached onto the top surface and a spaced apart second hook or loop fastener attached to the top surface.

Referring to FIG. 5, there is illustrated a top plan view of the flat horizontal base section 10 having a top surface 16 with a first hook or loop fastener 6 attached onto the top surface 16 and a spaced apart second hook or loop fastener 8 attached to the top surface 16.

Figure 6:
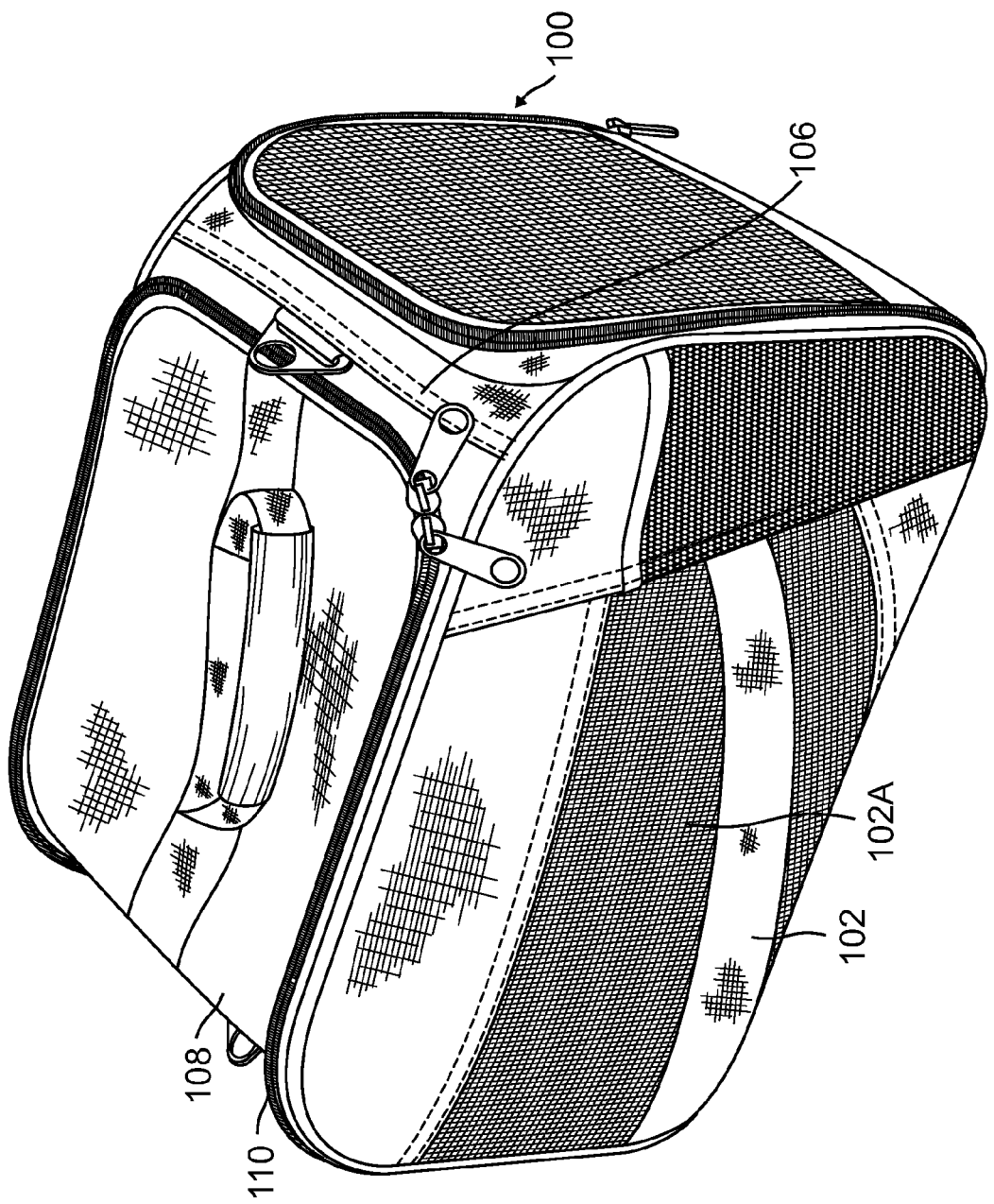
FIG. 6 is a left top perspective view of the pet transport carrier illustrating a ventilated rear section, a ventilated first sidewall and a top wall which retains a flap cover which is retained in a closed condition by a closing member such as a zipper.
Figure 7:
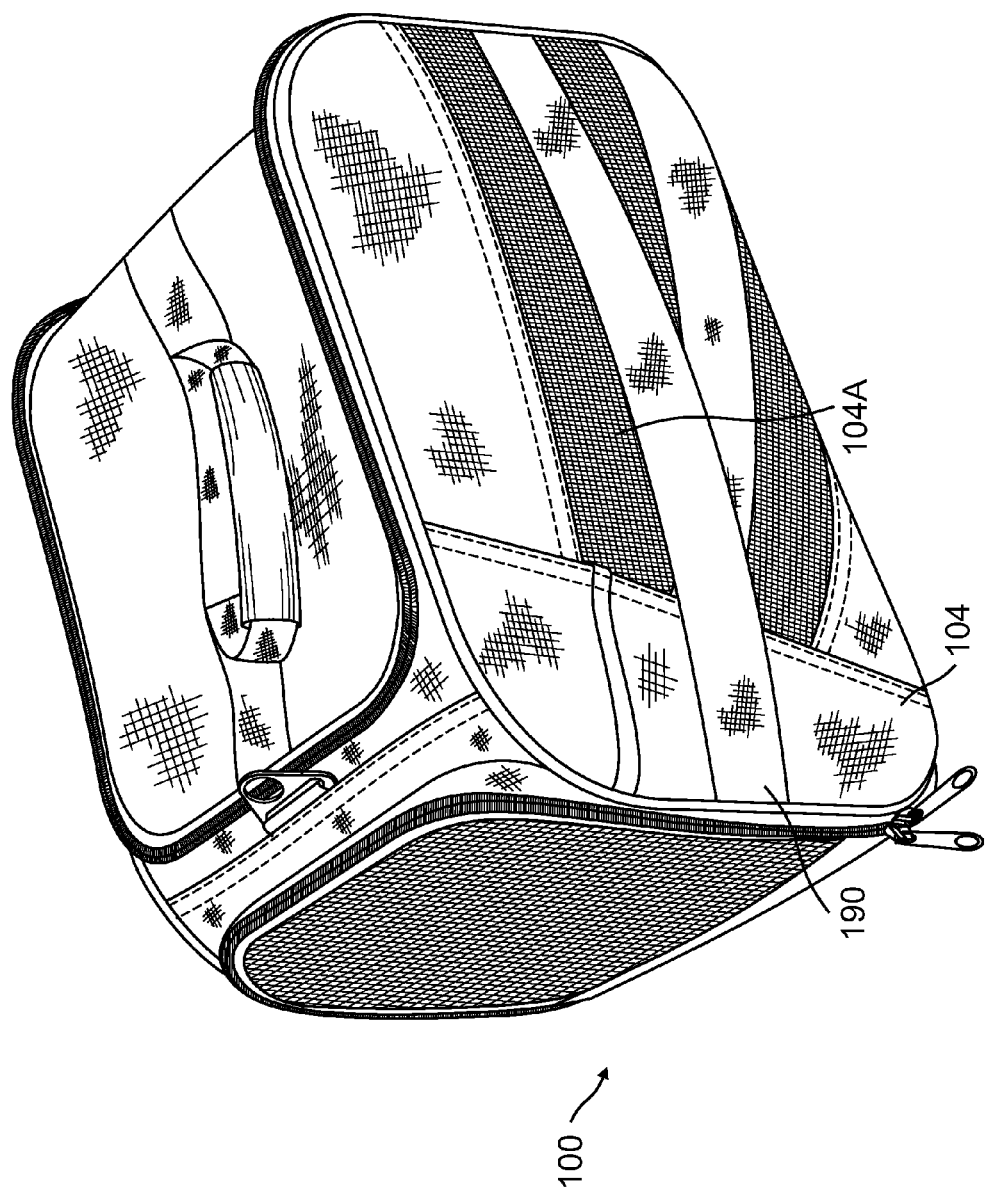
FIG. 7 is a right top perspective view of the pet transport carrier illustrating a ventilated rear section, a ventilated section sidewall and a top wall which retains a flap cover which is retained in a closed condition by a closing member such as a zipper.
Figure 8:
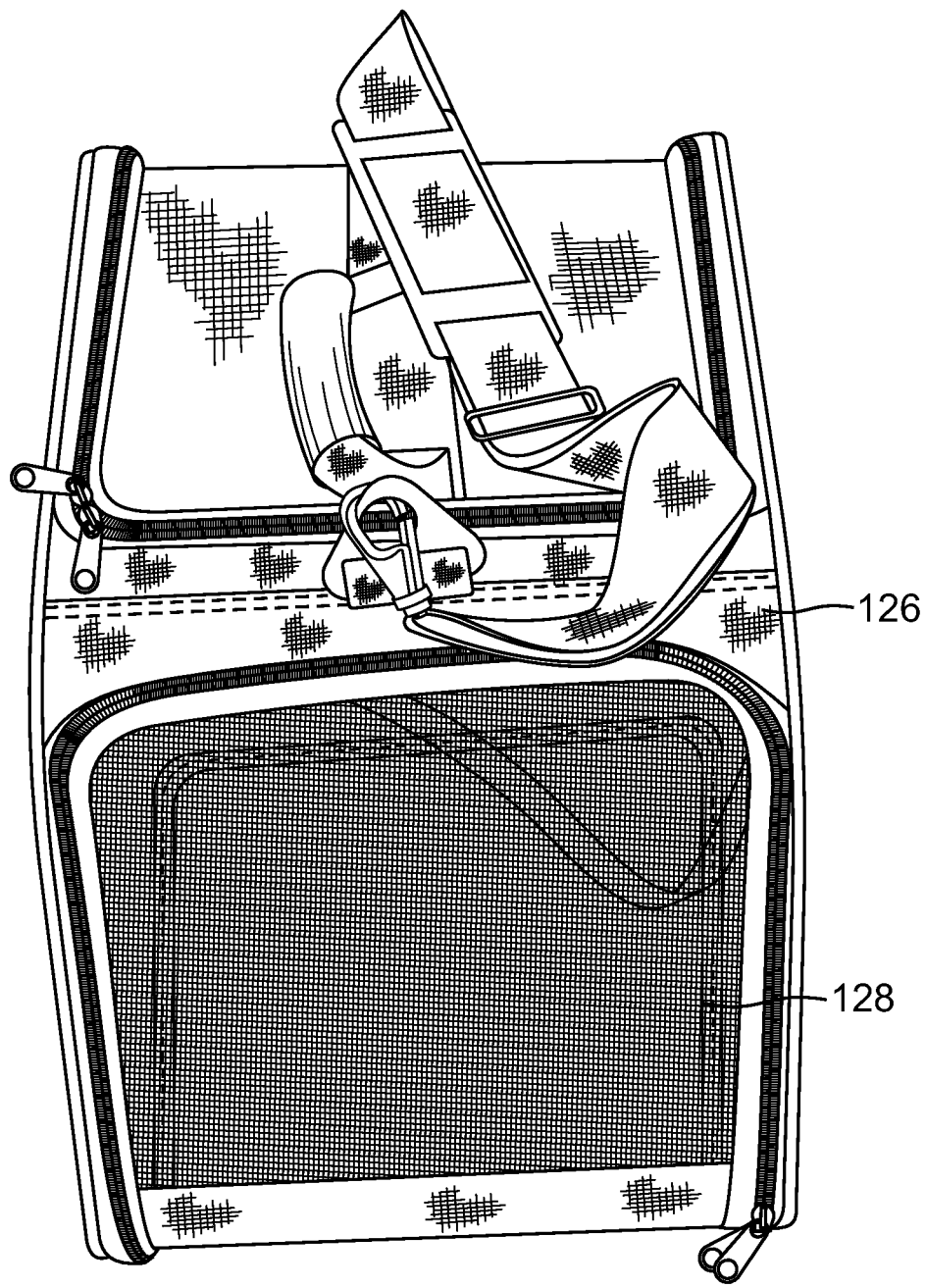
FIG. 8 is a rear elevational view of the pet transport carrier illustrating a ventilated rear section and a top wall which retains a flap cover which is retained in a closed condition by a closing member such as a zipper.
Figure 9:
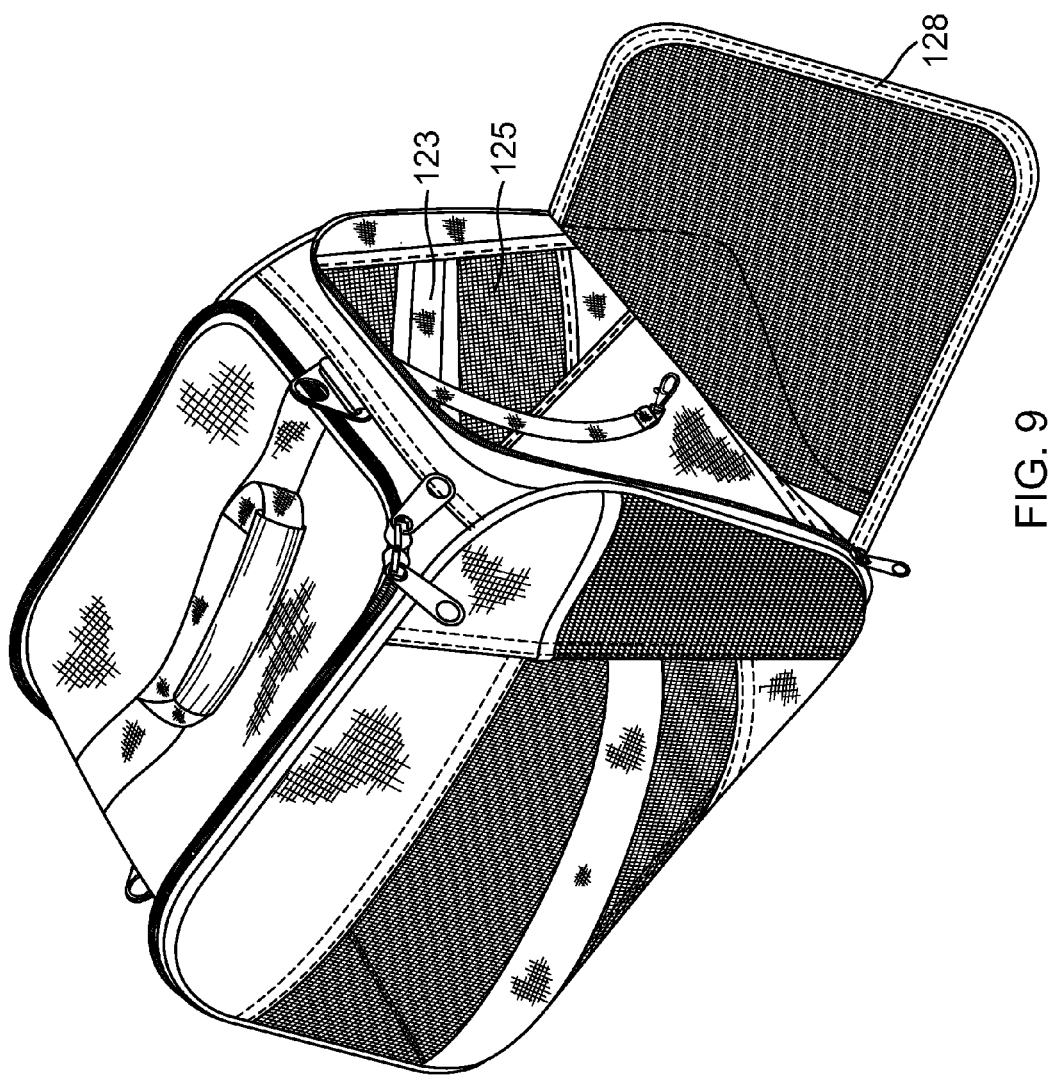
FIG. 9 is rear elevational view of the pet transport carrier illustrating the ventilated rear section removed to show a pet retainer across the rear opening.
Figure 10:
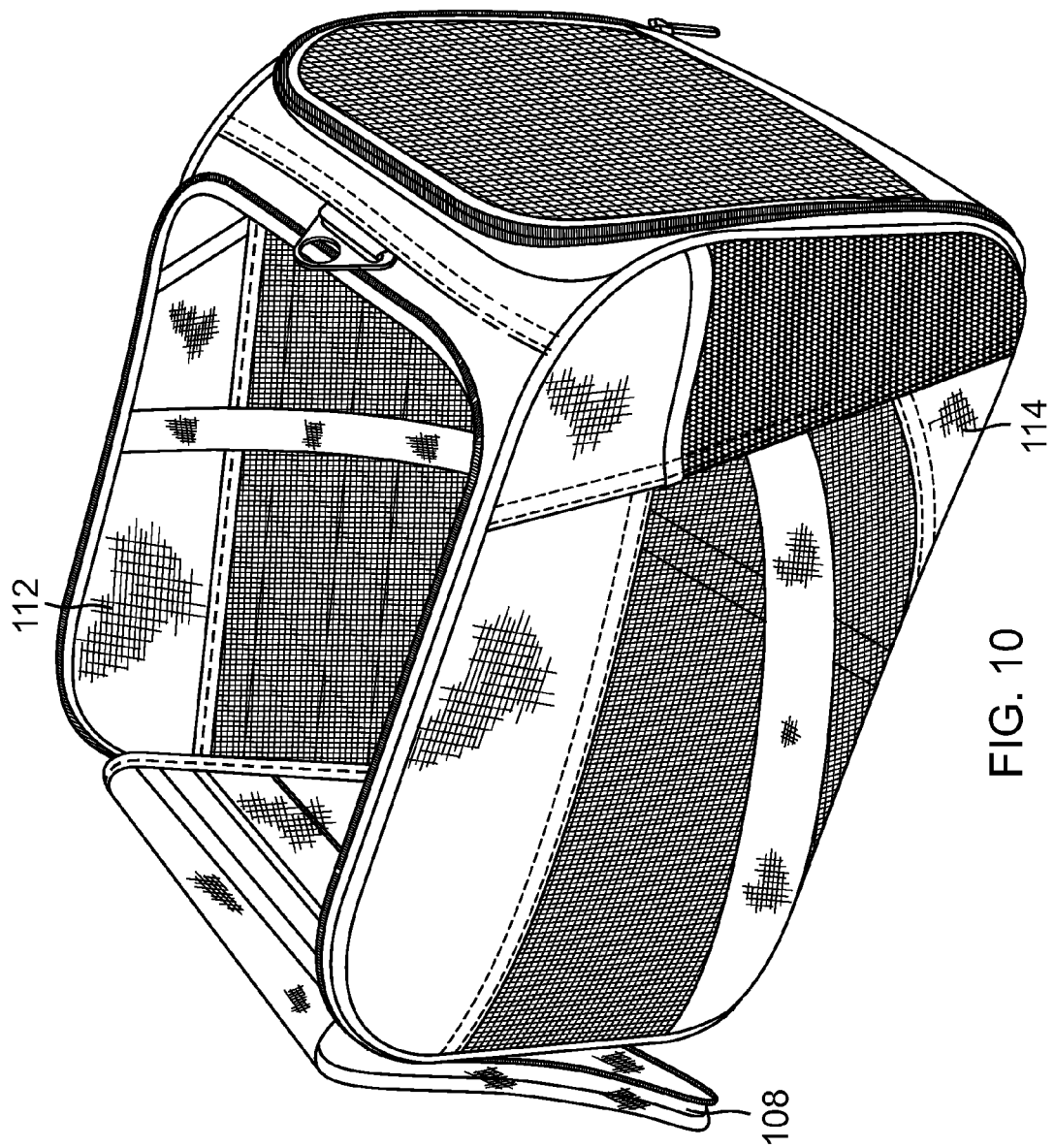
FIG. 10 is a top perspective view of the pet transport carrier when the zipper is opened illustrating the flap cover folded away so that access to the interior chamber of the pet carrier is facilitated.
Figure 11:
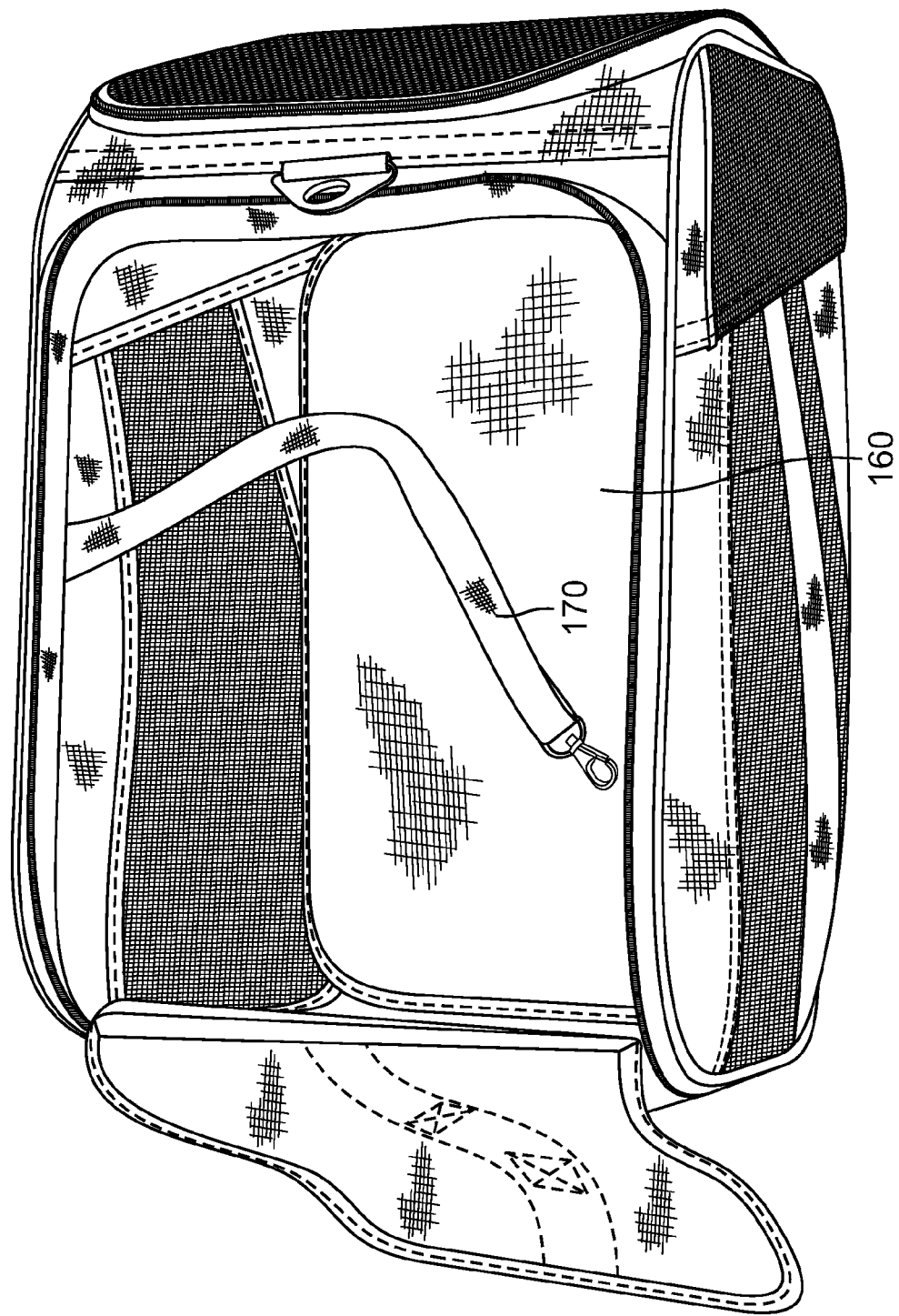
FIG. 11 is a top plan view of the pet transport carrier when the zipper is opened illustrating the flap cover folded away so that access to the interior chamber of the pet carrier is facilitated and illustrating a soft interior bedding, also illustrating a collar clip to restrain a dog, and also illustrating a drink holder on the sidewall.

Referring to FIGS. 6 and 7, there is illustrated top perspective views of the pet transport carrier 100 having a pair of oppositely disposed sidewalls 102 with ventilation portion 102A and 104 with ventilation portion 104A and a top wall 106 which retains a flap cover 108 which is retained in a closed condition by a closing member such as a zipper 110. When the zipper 110 is opened, as illustrated in FIGS. 10 and 11, the flap cover 108 is folded away so that access to the interior chamber 112 is facilitated. The pet such as a small dog or cat is placed in the interior chamber 112 which is surrounded by the sidewalls 102 and 104, the top cover 106, the flap cover 108 and bottom wall 114. The size of the pet transport carrier 100 is small enough to fit under a passenger seat in an airplane so that an owner can travel with the owner's small dog or cat. As illustrated in FIG. 8, the rear wall 126 has a screen section 128 to provide further ventilation, as illustrated in FIG. 8. As illustrated in FIG. 9, the screen section 128 can be folded down and a cross-pet retainer 125 preventing the pet from coming out of the rear opening 123.

Figure 14:
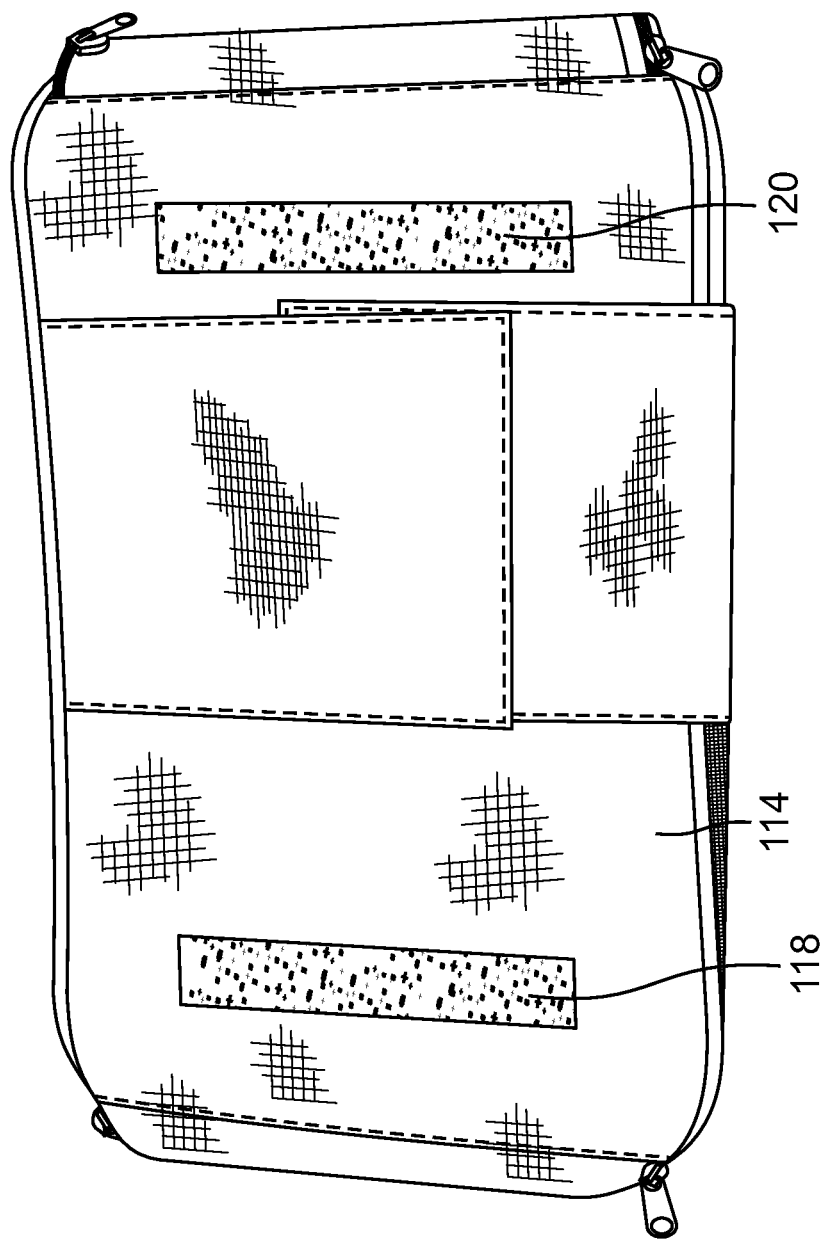
FIG. 14 is a bottom plan view of the pet transport carrier illustrating a pair of spaced apart hook or loop fasteners affixed to the bottom wall, a respective hook or loop fastener respectively aligned with a hook or loop fastener on the top surface of flat horizontal base to removably retain the pet transport carrier on the flat horizontal base, and a strap affixed to the bottom surface of the pet carrier used to further secure the pet transport carrier to the dolly, the strap in the closed condition.

Referring to FIG. 14 there is illustrated a bottom plan view of the pet transport carrier 10 illustrating another innovation of the present invention with a pair of spaced apart hook or loop fasteners 118 and 120 affixed to bottom wall 114. A respective hook or loop fastener 118 and 120 is respectively aligned with a hook or loop fastener 6 and 8 on top surface 16 of flat horizontal base 10 to removably retain the pet transport carrier 100 on the flat horizontal base 10.

Figure 15:
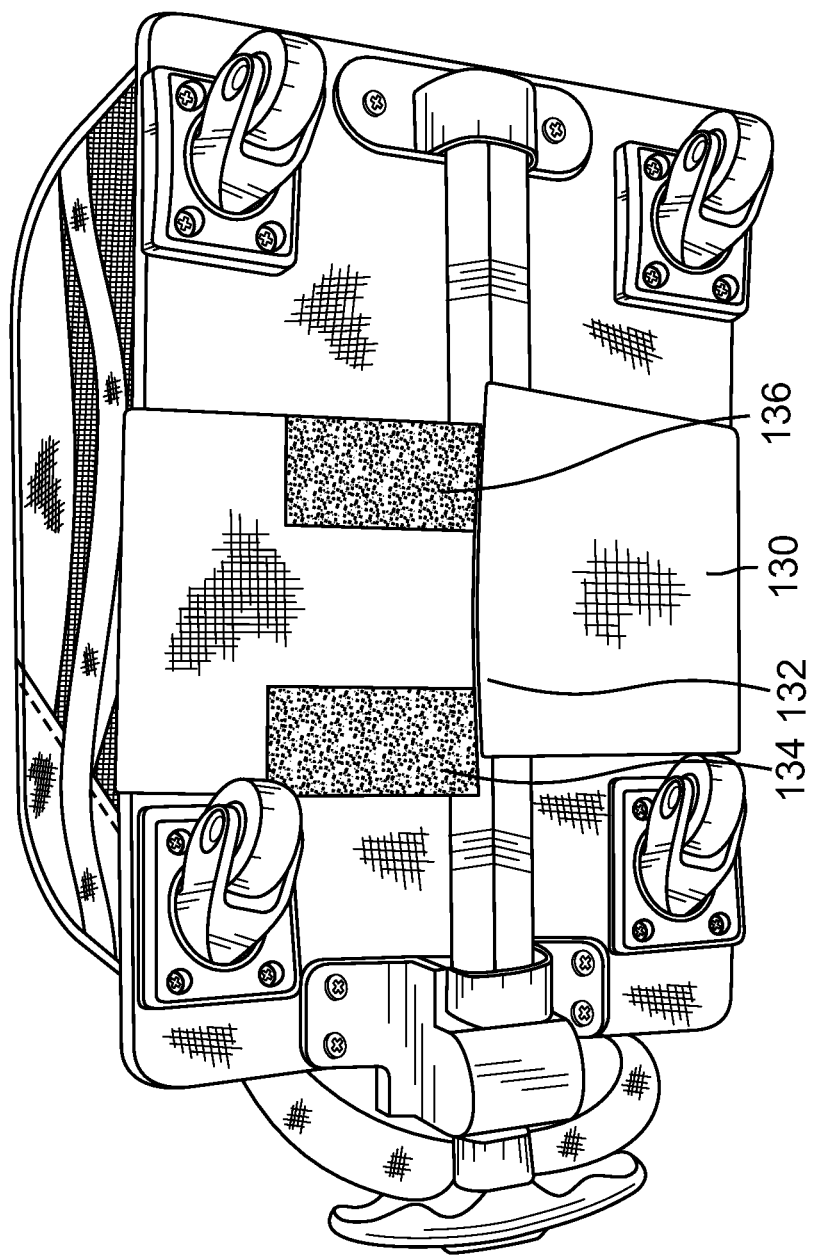
FIG. 15 illustrates the bottom wall of the pet transport carrier having a strap with a pair of mating hook and loop fasteners adjacent opposite ends of the top surface of the strap so that the strap can be rotated so that it is rotated around the bottom of the flat horizontal platform and retained together by the mating hook and loop fasteners so that the pet transport carrier is further securely removably retained to the flat horizontal platform.

In addition, as illustrated in FIG. 15, the bottom wall 114 of the pet transport carrier 100 has a strap 130 with a pair of mating hook and loop fasteners 134 and 136 adjacent opposite ends of the top surface 132 of the strap 130. The strap 130 can be rotated so that it is rotated around the bottom 14 of the flat horizontal platform 10 and retained together by the mating hook and loop fasteners 134 and 136 so that the pet transport carrier 100 is further securely removably retained to the flat horizontal platform 10 when it is in motion.

Figure 18:
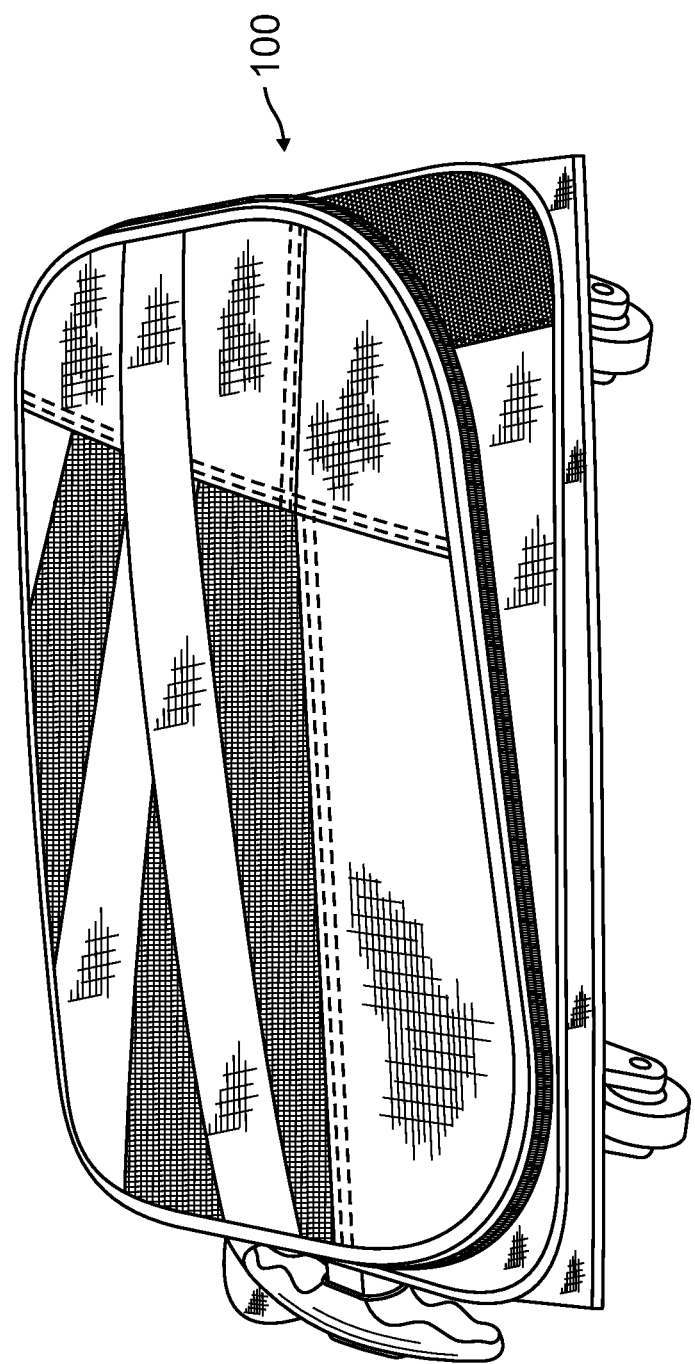
FIG. 18 illustrates the pet transport carrier having flexible sidewalls so that it can be folded flat against the flat horizontal platform and retained in a flat condition with the hook and loop fasteners wrapped around the pet transport carrier and mating under the lower surface of flat horizontal platform so that it can be easily stored and folds to less than four inches in width when in the unused condition.

As illustrated in FIG. 18, the pet transport carrier 100 has flexible sidewalls 102 and 104 so that it can be folded flat against the flat horizontal platform 10 and retained in a flat condition with the hook and loop fasteners 132 and 134 wrapped around pet transport carrier 100 and mating under the lower surface 114 of flat horizontal platform 10 so that it can be easily stored and therefore, folds to less than four inches in width when in the unused condition.

As illustrated in FIGS. 12 and 13, the pet transport carrier 100 when unfolded rests on the flat horizontal base 10 where it is the removably affixed by a pair of mating hook and loop fasteners 118, 120, 6 and 8 on the front and back lower surface 114 of the pet transport carrier 100 and top surface 12 of the flat horizontal platform 10 and then the separate strap 130 that goes underneath the flat horizontal base or platform 10 with a telescoping handle 50 that is rotated at an angle for use so that a person can be pulling the rolling combination pet transport carrier 100 and flat horizontal platform 10 behind them without having the pet transport carrier 100 moved at an upward angle which is uncomfortable for the pet. This unique feature enables the carrier to be rolled in a horizontal manner on a flat surface.

Figure 17:
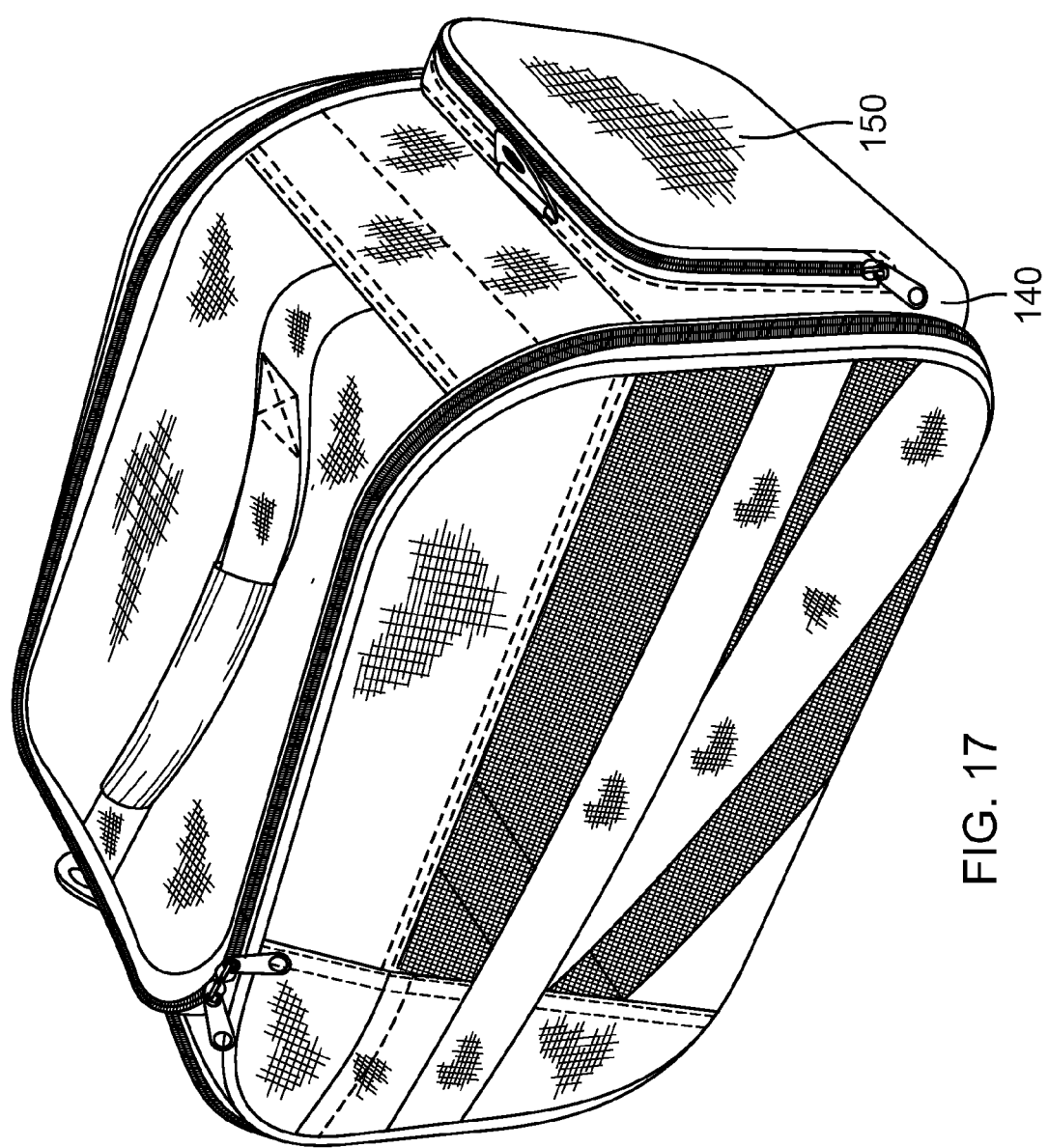
FIG. 17 is a side perspective view of the pet transport carrier illustrating a seat belt strap for safe car travel.

As illustrated in FIG. 17, the pet transport carrier 100 has a front wall 140 which has a larger zipper pocket 150 for treats, dog bags, etc.

As illustrated in FIG. 11, the interior of the pet transport carrier 100 includes comfort bedding 160 and a collar clip 170.

Figure 16:
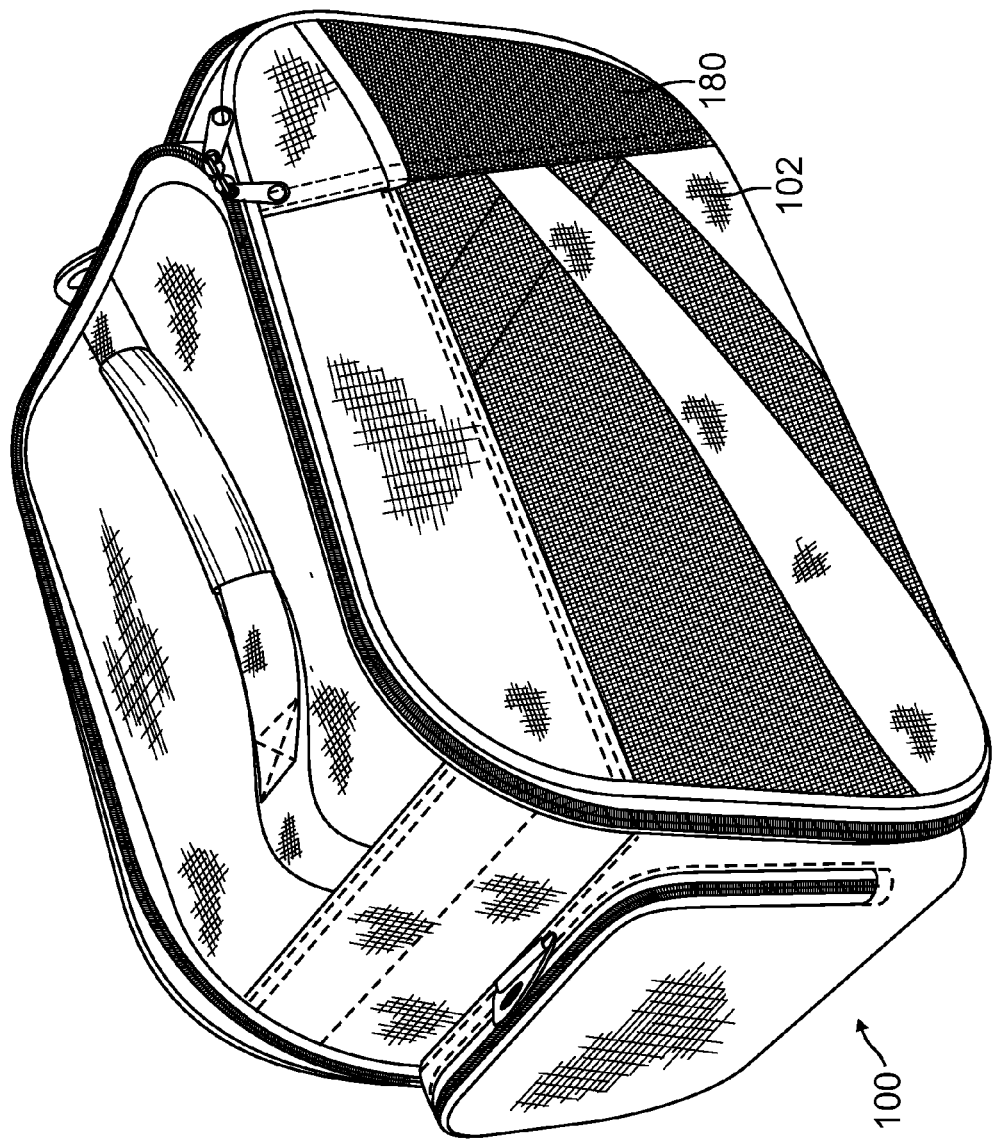
FIG. 16 is a front side elevational view of the pet transport carrier illustrating a container for dog treats.

As illustrated in FIG. 16, the pet transport carrier 100 also has a beverage holder 180 retained on an exterior wall such as 102.

As illustrated in FIG. 12, the pet transport carrier 100 has a removable shoulder strap 182 for carrying the pet inside.

As illustrated in FIG. 7, the pet transport carrier 100 also includes a seat belt strap 190 for safe car travel.

The telescoping handle 50 can be folded to be retained under the flat horizontal base 10 and then slid under a receiving telescoping member 57 underneath the flat horizontal base 10 and then the pet transport carrier 100 can be folded flat and retained against the flat horizontal base 10 in the unused condition as previously described so that it can fold flat to less than four inches.

With the pet transport carrier 100 removed, the flat horizontal platform 10 itself can support a weight of 100 lbs so that a pack of water bottles, a pack of soda etc. can be moved with the rolling flat horizontal platform 10 and pulled by the telescoping handle 50. This is an ancillary benefit.

When removed from the flat horizontal platform 10, the pet transport carrier 100 in the unfolded condition and retaining the pet is also small enough so that it can fit under a seat in a coach aircraft so that people who travel with pets can carry the animal on the plane and retain the pet such as a small dog or cat within the carrier. By way of example, the pet transport carrier 100 in the unfolded condition can be 18 inches long, 10 inches wide and 10 inches high.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A pet transport carrier combination, comprising:
   a. a flat base platform which has four wheels including two spaced apart rear wheels which are heavy duty luggage wheels that rotate in a straight direction and two spaced apart front wheels which are rotating wheels so that the flat base platform is rotatable in any direction;
   b. a handle attached to telescoping sections with one telescoping section connected to the flat base platform by a rotation mechanism to enable the telescoping handle to be rotated to a 45 degree angle relative to the flat base platform so that a pet transport carrier is removably attached to the flat base platform and retained in a horizontal orientation relative to the ground while the flat base platform is rolled on the ground to transport the pet transport carrier from one location to another, the telescoping handle is foldable rotatable and to be horizontally aligned with an underside of the flat base platform and then rotated so that it is retained under the flat base platform when in storage;
   c. the pet transport carrier contains a strap having a pair of hook and/or loop strips on opposite sides of the strap so that the strap is rotated around the bottom of the flat base platform and fastened together under the flat base platform to removably retain the pet transport carrier onto the flat base platform, in addition, the pet transport carrier has a pair of spaced apart hook or loop fasteners on its bottom surface and an upper surface of the flat base platform has a mating pair of spaced apart hook or loop fasteners which mate with a respective hook or loop fastener on the underside of the pet transport carrier to further removably retain the pet transport carrier onto the flat base platform; and
   d. the pet transport carrier is foldable to be flat against the flat base platform with the strap and its hook and loop fasteners wrapped around the folded pet transport carrier and flat base platform and fastened with the strap's mating hook and loop fasteners so that the entire assembly is very flat and folds to less than four inches in width when in the unused condition to facilitate convenient storage.

2. A pet transport carrier combination, comprising:
   a. a flat base which includes a telescoping handle which extends at an angle to the flat base, the telescoping handle has a first section which terminates in a transverse handle at its distal end and is connected to a second section at its proximal end, the first section having a smaller diameter than the second section and is retained in its extended condition by a transverse pin extending through respective aligned openings in the first section and second section, when the transverse pin is pushed inwardly, the first section is pushed into and retained in the second section, the second section has a rotatable mechanism which enables the telescoping handle to be rotated to an extended position, the rotatable mechanism enables the telescoping handle to be rotated to a horizontal position and then is rotated horizontally under the base and retained under horizontal surface of the base by a retaining sleeve which in turn is retained by a first retaining member and spaced apart second retaining member with the transverse handle adjacent the rotation member which enables the second handle section to be rotated to the angled orientation;
   b. the bottom surface of the flat horizontal base has four wheels affixed to the bottom surface of which the rear two wheels are heavy duty luggage wheels that rotate in a straight direction and the initial front two wheels are rotating wheels so that flat base is rotatable in any direction;
   c. the flat base has a top surface with a first hook or loop fastener attached onto the top surface and a spaced apart second hook or loop fastener attached to the top surface, a pet transport carrier has a pair of oppositely disposed sidewalls with a ventilation portion in each sidewall and a top wall which retains a flap cover which is retained in a closed condition by a closing member, and when the closing member is opened, the flap cover is folded away so that access to an interior chamber is facilitated, the interior chamber is surrounded by the sidewalls, the top cover, the flap cover, a rear wall and a bottom wall, the rear wall having a ventilation screen which has a screen section which is capable of being folded down and function as a retaining member; and
   d. a pair of spaced apart hook or loop fasteners affixed to the bottom wall, a respective hook or loop fastener is respectively aligned with a hook or loop fastener on top surface of flat base to removably retain the pet transport carrier on the flat base, the bottom wall has a strap with a pair of mating hook and loop fasteners adjacent opposite ends of the top surface of the strap, the strap rotatable around the bottom of the flat base and retained together by the mating hook and loop fasteners so that the pet transport carrier is further securely removably retained to the flat base when it is in motion.

3. The pet transport carrier in accordance with claim 2, further comprising:
   a. flexible sidewalls to enable the pet transport carrier to be folded flat against the flat base and retained in a flat condition with the hook and loop fasteners wrapped around pet transport carrier and mating under the lower surface of the flat base so that it can be easily stored and folds to less than four inches in width when in the unused condition.

4. The pet transport carrier in accordance with claim 2, further comprising: when removed from the horizontal base, the pet transport carrier in the unfolded, condition can fit under a coach passenger seat in an airplane.

5. The pet transport carrier in accordance with claim 2, further comprising: a front wall which has a large pocket.

6. The pet transport carrier in accordance with claim 2, further comprising: interior bedding and a collar clip.

7. The pet transport carrier in accordance with claim 2, further comprising: a beverage holder retained on an exterior wall.

8. The pet transport carrier in accordance with claim 2, further comprising: removable shoulder strap.

9. The pet transport carrier in accordance with claim 2, further comprising: a seat belt strap.

10. A pet transport carrier combination, comprising:
    a. a flat base platform which has four wheels including two spaced apart rear wheels which are heavy duty luggage wheels that rotate in a straight direction and two spaced apart front wheels which are rotating wheels so that the flat base platform is rotatable in any direction;
    b. a handle attached to telescoping sections with one telescoping section connected to the flat base platform by a rotation mechanism to enable the telescoping handle to be rotated to a 45 degree angle relative to the flat base platform so that a pet transport carrier is removably attached to the flat base platform and retained in a horizontal orientation relative to the ground while the flat base platform is rolled on the ground to transport the pet transport carrier from one location to another, the telescoping handle is foldable and rotatable to be horizontally aligned with an underside of the flat base platform and then rotated so that it is retained under the flat base platform when in storage; and c. the pet transport carrier contains a strap having a pair of hook and/or loop strips on opposite sides of the strap so that the strap is rotated around the bottom of the flat base platform and fastened together under the flat base platform to removably retain the pet transport carrier onto the flat base platform, in addition, the pet transport carrier has a pair of spaced apart hook or loop fasteners on its bottom surface and an upper surface of the flat base platform has a mating pair of spaced apart hook or loop fasteners which mate with a respective hook or loop fastener on the underside of the pet transport carrier to further removably retain the pet transport carrier onto the flat base platform.

11. The pet transport carrier in accordance with claim 10, further comprising: the pet transport carrier is foldable to be flat against the flat base platform with the strap and its hook and loop fasteners wrapped around the folded pet transport carrier and flat base platform and fastened with the strap's mating hook and loop fasteners so that the entire assembly is very flat and folds to less than four inches in width when in the unused condition to facilitate convenient storage.

12. The pet transport carrier in accordance with claim 10, further comprising:

a. flexible sidewalls to enable the pet transport carrier to be folded flat against the flat base and retained in a flat condition with the hook and loop fasteners wrapped around pet transport carrier and mating under the lower surface of the flat base so that it can be easily stored and folds to less than four inches in width when in the unused condition.

13. The pet transport carrier in accordance with claim 10, further comprising: when removed from the horizontal base, the pet transport carrier in the unfolded condition can fit under a coach passenger seat in an airplane.

14. The pet transport carrier in accordance with claim 10, further comprising: a front wall which has a large pocket.

15. The pet transport carrier in accordance with claim 10, further comprising: interior bedding and a collar clip.

16. The pet transport carrier in accordance with claim 10, further comprising: a beverage holder retained on an exterior wall.

17. The pet transport carrier in accordance with claim 10, further comprising: a removable shoulder strap.

18. The pet transport carrier in accordance with claim 10, further comprising: a seat belt strap.

* * * * *